United States Patent Office 3,051,705
Patented Aug. 28, 1962

3,051,705
SUBSTITUTED DIPHENYL-CHLORACETATES
Seymour L. Shapiro, Hastings on Hudson, Louis Freedman, Bronxville, and Harold Soloway, New Rochelle, N.Y., assignors to U. S. Vitamin & Pharmaceutical Corporation, a corporation of Delaware
No Drawing. Filed Apr. 7, 1960, Ser. No. 20,529
4 Claims. (Cl. 260—247.2)

This invention relates to certain novel diphenylchloracetic acid esters and the salts thereof which have useful pharmacological properties. The compounds of this invention may be represented by the general formula $$C_6H_5-\underset{\underset{C_6H_5}{|}}{\overset{\overset{Cl}{|}}{C}}-\overset{\overset{O}{\|}}{C}-O-\underset{\underset{R}{|}}{\overset{\overset{H}{|}}{C}}-\underset{\underset{R_1}{|}}{\overset{\overset{H}{|}}{C}}-N\diagdown\overset{R_2}{\underset{R_3}{}}$$

wherein R and $R_1$ are selected from the group consisting of hydrogen and phenyl so that when R=phenyl, $R_1$=hydrogen and when R=hydrogen, $R_1$=phenyl, $R_2$ is selected from the group consisting of lower alkyl, aralkyl and cycloalkyl; and wherein with the nitrogen $R_2$ and $R_3$ form heterocyclic rings such as pyrrolidino, piperidino and morpholino, and $C_6H_5$ is phenyl.

The compounds of this invention show useful pharmacological properties particularly as central nervous system depressants, and antitremorine effects. (This latter activity has been associated with the capacity to inhibit the tremors of Parkinson's disease.)

The preparation of the novel compounds of this invention is effected by treatment of the acid chloride $$(C_6H_5)_2C(Cl)COCl$$

with the amino alcohol of the formula shown $$\underset{R_3}{\overset{R_2}{\diagdown}}N-\underset{\underset{R}{|}}{\overset{\overset{H}{|}}{C}}-\underset{\underset{R_1}{|}}{\overset{\overset{H}{|}}{C}}-OH$$

An inert organic solvent such as benzene or acetonitrile is used for the reaction and after a suitable period the formed ester is either isolated directly as its hydrochloride or the hydrochloride is converted to the free base which is isolated by distillation.

The requisite amino alcohols used as initial reactants have been described by Shapiro, et al., J. Am. Chem. Soc., 80, 6060 (1958).

The compounds are bases and can be converted to their hydrohalide salts by treatment of one equivalent of the basic ester with one equivalent of hydrogen halide in a medium such as ethanol and the like. The free bases can also be converted to their quaternary ammonium salts by treatment of the base with such reagents as methyl iodide, ethyl bromide, benzyl chloride, ethyl bromoacetate and the like.

The compounds which have been prepared in the development of this invention are shown in Table I.

TABLE I $$(C_6H_5)_2-\underset{\underset{Cl}{|}}{C}-COOCH-\underset{\underset{C_6H_5}{|}}{C}H_2-NR_2R_3 \cdot R_4X^{a,b}$$

| $R_2$ | $R_3$ | $R_4X$ | M.P. °C. or °B.P. (mm.) | Percent Yield [d] | Formula | Analyses percent [e] | | |
|---|---|---|---|---|---|---|---|---|
| | | | | | | C Calc. Fd. | H Calc. Fd. | N Calc. Fd. |
| —(CH$_2$)$_4$— | | HCl | 178–181 | 31 | $C_{26}H_{27}Cl_2NO_2$ | 68.4 68.2 | 6.0 5.9 | 3.1 3.0 |
| —(CH$_2$)$_4$—[f] | | HCl | 182–184 | 25 | $C_{26}H_{27}Cl_2NO_2$ | 68.4 67.9 | 6.0 5.8 | |
| —(CH$_2$)$_5$— | | HCl | 169–171 | 66 | $C_{27}H_{29}Cl_2NO_2$ | 68.9 68.2 | 6.2 6.8 | 3.0 3.3 |
| —(CH$_2$)$_2$O(CH$_2$)$_2$— | | HCl | 184–186 | 36 | $C_{26}H_{27}Cl_2NO_3$ | 66.1 66.1 | 5.8 6.0 | 3.0 3.1 |

[a] The term $R_4X$ defines the hydrohalide salt or quaternizing group.
[b] The term $C_6H_5$— is phenyl.
[c] Melting points are not corrected.
[d] Yields are expressed as percent of recrystallized or distilled product.
[e] Analyses are by Weiler and Strauss, Oxford, England.
[f] The compound is derived from the isomeric 2-(1-pyrrolidino)-2-phenylethanol.

Following are illustrative examples characteristic of but not limiting the scope of the invention.

EXAMPLE 1

*2-Piperidino-1-Phenylethyl α-Chloro-α,α-Diphenylacetate Hydrochloride*

A solution of 19.9 g. (0.075 mole) of α-chlorodiphenylacetyl chloride in 70 mls. of acetonitrile was added to a suspension of 14.3 g. (0.07 mole) of 2-piperidino-1-phenylethanol in 30 mls. of acetonitrile. After storage at 20° for 24 hours there was obtained 30.2 g. which upon recrystallization (methyl ethyl ketone) gave 66% of product M.P. 169–171°.

The other compounds in the table are prepared in a similar manner.

The novel compounds of this invention can be combined with solid or liquid pharmaceutical carriers and formulated into the form of tablets, powder packets or capsules or dissolved in suitable solvents for oral and parenteral administration for human and veterinary use.

It is to be understood that it is intended to cover all changes and modifications of the example herein chosen for the purpose of illustration which do not constitute departures from the spirit and scope of the invention.

This application is a continuation-in-part of our copending application, Serial No. 814,387, filed May 20, 1959, now abandoned.

We claim:
1. The compound

$$\underset{}{\overset{}{\bigcirc}}-\underset{\underset{\bigcirc}{|}}{\overset{\overset{Cl}{|}}{C}}-\overset{\overset{O}{\|}}{C}-O-\underset{\underset{\bigcirc}{|}}{\overset{\overset{H}{|}}{C}}-CH_2-N\diagup\overset{}{\underset{}{\bigcirc}}$$

2. The compound

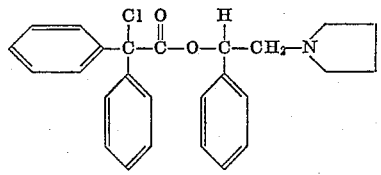

3. The compound

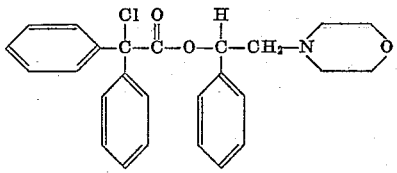

4. The compound selected from the group consisting of diphenylchloracetate esters of aminophenylethanol and the non-toxic hydrochloric acid salts and methiodide salts thereof of the formula

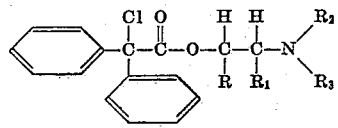

in which esters and salts R and $R_1$ are selected from the group wherein one of R and $R_1$ is hydrogen and the other is phenyl, and wherein $-NR_2R_3$ is selected from the group consisting of pyrrolidino, morpholino, and piperidino.

References Cited in the file of this patent
UNITED STATES PATENTS 2,628,247     Goldberg et al. _____ Feb. 10, 1953

UNITED STATES PATENT OFFICE
CERTIFICATE OF CORRECTION

Patent No. 3,051,705                                             August 28, 1962

Seymour L. Shapiro et al.

It is hereby certified that error appears in the above numbered patent requiring correction and that the said Letters Patent should read as corrected below.

Column 1, lines 45 to 47, strike out "$R_2$ is selected from the group consisting of lower alkyl, aralkyl and cycloalkly;".

Signed and sealed this 15th day of January 1963.

(SEAL)
Attest:

ERNEST W. SWIDER                                             DAVID L. LADD
Attesting Officer                                                 Commissioner of Patents